(12) United States Patent
Farkas et al.

(10) Patent No.: US 8,183,330 B2
(45) Date of Patent: May 22, 2012

(54) SOFT, ELASTIC, PLASTICIZER-FREE THERMOPLASTIC POLYURETHANE AND PROCESS TO SYNTHESIZE THE SAME

(75) Inventors: Julius Farkas, North Ridgeville, OH (US); Ravi R. Vedula, North Ridgeville, OH (US); Charles P. Jacobs, Elyria, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 378 days.

(21) Appl. No.: 12/255,889

(22) Filed: Oct. 22, 2008

(65) Prior Publication Data

US 2009/0100723 A1   Apr. 23, 2009

Related U.S. Application Data

(60) Provisional application No. 60/981,523, filed on Oct. 22, 2007.

(51) Int. Cl.
*C08G 63/06* (2006.01)

(52) U.S. Cl. .......................... 525/450; 525/460

(58) Field of Classification Search .................. None
See application file for complete search history.

(56) References Cited

U.S. PATENT DOCUMENTS

| | | | |
|---|---|---|---|
| 5,959,059 A * | 9/1999 | Vedula et al. ............ 528/76 |
| 6,284,370 B1 * | 9/2001 | Fujimoto et al. .......... 428/364 |
| 6,749,781 B1 | 6/2004 | Maurer | |
| 7,202,322 B2 | 4/2007 | Vedula et al. | |
| 7,225,491 B2 | 6/2007 | Reed et al. | |
| 2003/0162932 A1 | 8/2003 | Brauer et al. | |
| 2004/0092696 A1 * | 5/2004 | Vedula et al. .............. 528/44 |
| 2004/0230012 A1 * | 11/2004 | Vedula et al. ............. 525/453 |
| 2005/0107562 A1 | 5/2005 | Leberfinger et al. | |

FOREIGN PATENT DOCUMENTS

| | | |
|---|---|---|
| EP | 1234844 A1 | 8/2002 |
| WO | 03/051949 A1 | 6/2003 |

OTHER PUBLICATIONS

Performance Plastics, "Performance Plastics Shore a conversion chart", May 2005, Web.*

* cited by examiner

*Primary Examiner* — Randy Gulakowski
*Assistant Examiner* — Jeffrey Washville
(74) *Attorney, Agent, or Firm* — Joe A. Powell; Christopher D. Hilker

(57) ABSTRACT

The present invention discloses a thermoplastic polyurethane which is comprised of the reaction product of (1) a hydroxyl terminated intermediate, (2) a polyisocyanate, and (3) a glycol chain extender selected from the group consisting of ethylene glycol and propylene glycol; wherein the hydroxyl terminated intermediate is selected from the group consisting of hydroxyl terminated polyether intermediates and hydroxyl terminated polyester intermediates; wherein the hydroxyl terminated intermediate is comprised of repeat units that are derived from a branched glycol or is comprised of at least 2 different repeating units; wherein the thermoplastic polyurethane has a weight average molecular weight of at least 100,000 Daltons; wherein the thermoplastic polyurethane includes hard segments that are the reaction product of the polyisocyanate and the glycol chain extender; and wherein the hard segments represent from 10 to 40 weight percent of the total weight of the thermoplastic polyurethane.

15 Claims, No Drawings

SOFT, ELASTIC, PLASTICIZER-FREE THERMOPLASTIC POLYURETHANE AND PROCESS TO SYNTHESIZE THE SAME

CROSS REFERENCE TO RELATED APPLICATION

This application claims priority of U.S. Provisional Application Ser. No. 60/981,523 filed on Oct. 22, 2007.

FIELD OF THE INVENTION

The present invention relates to plasticizer-free thermoplastic polyurethane (TPU) compositions that have melting points of greater than 170° C. and a Shore A hardness of less than 75. The TPU compositions of this invention also have a high level of resistance to compression set and are useful in applications that require a soft polymer that can be exposed to high temperatures. For instance, the TPU compositions of this invention exhibit characteristics that make them particularly desirable for utilization in manufacturing shoe components and melt spun fibers. This invention also relates to a process for synthesizing such TPU compositions and to articles of manufacture made using them.

BACKGROUND OF THE INVENTION

TPU polymers are typically made by reacting (1) a hydroxyl terminated polyether or hydroxyl terminated polyester, (2) a chain extender, and (3) an isocyanate compound. Various types of compounds for each of the three reactants are disclosed in the literature. The TPU polymers made from these three reactants find use in various fields where products are made by melt processing the TPU and forming it into various shapes to produce desired articles by processes such as extrusion and molding. An important use of TPU is in the area of making melt spun elastic fibers. The TPU fibers can be combined with other natural and synthetic fibers to make clothing and a variety of other consumer and industrial products.

TPUs are segmented polymers having soft segments and hard segments. This feature accounts for their excellent elastic properties. The soft segments are derived from the hydroxyl terminated polyether or polyester and the hard segments are derived from the isocyanate and the chain extender. The chain extender is typically one of a variety of glycols, such as 1,4-butane glycol.

U.S. Pat. No. 5,959,059 discloses a TPU made from a hydroxyl terminated polyether, a glycol chain extender, and a diisocyanate. This TPU is described as being useful for making fibers, golf ball cores, recreational wheels, and other uses.

One of the typical deficiencies of conventional TPU fibers is their inability to withstand the high temperatures that are normally encountered in manufacturing procedures. For instance, high temperature resistance is important if one wishes to make an article, such as clothing, by combining the TPU fibers with synthetic fibers, such as polyester fibers. This is because synthetic fibers must be dyed and heat set at high temperatures to prevent the clothing made therewith from shrinking during subsequent washing and drying cycles. For this reason, conventional TPU fibers that do not offer resistance to high temperatures are normally used in combination with natural fibers such as cotton, which do not require high temperature heat treatment.

Higher temperature resistance is also highly desirable in cases where TPU is used in fabric coating applications. For instance, in clothing a fabric coating can be employed wherein a TPU liner is used in conjunction with a fluro-polymer coating which is usually heated after application to the fabric to dry and cross-link the fluro-polymer. In such cases, the TPU needs to be capable of withstanding the elevated temperatures encountered in the drying and crosslinking steps of the procedure.

In numerous applications, it would be desirable for the TPU to have a high melting point for good high temperature resistance coupled with a low level of hardness, such as a Shore A hardness of less than 75 and preferably lower. In other words, a soft TPU having good high temperature resistance could be beneficially employed in such applications. However, soft TPUs having high melting points that are free of plasticizers have been elusive. This is because the melting point and the hardness of the TPU typically both increase with the level of chain extender utilized. Thus, it has typically been difficult to make a TPU having a high melting point by increasing the level of chain extender without also increasing the hardness of the polymer.

Plasticizers are commonly added to TPU compositions to make the polymer composition more elastic and softer. However, in many applications it is not desirable to add plasticizers to the TPU composition. For instance, the use of plasticizers in clear TPU compositions should be avoided because the presence of plasticizers can reduce the clarity of the composition. Thus, plasticizers are not desirable for utilization in TPU compositions where clarity is being sought. Plasticizers can also bloom or be extracted from such compositions in which case the hardness of the composition can increase to an undesirable level. The use of certain plasticizers has also come under scrutiny from environmental and toxicological standpoints. Accordingly, eliminating the need for plasticizers in TPU compositions would normally be deemed to be advantageous if desired physical characteristics could be attained without them.

U.S. Pat. No. 7,202,322 discloses a TPU having a high level of thermal resistance and a high moisture vapor transmission rate. These polymers are also impervious to liquid water and have electrostatic dissipating properties. These characteristics make them desirable for use in applications requiring high moisture vapor transmission properties, such as house wrap, roofing underlays, various textile coatings, and melt spun fibers. The TPU compositions described by U.S. Pat. No. 7,202,322 are prepared by reacting a hydroxyl terminated polyether intermediate, an aromatic chain extender glycol, and a polyisocyanate.

SUMMARY OF THE INVENTION

The TPU compositions of this invention offer a unique array of characteristics that are highly desirable for a variety of applications in manufacturing consumer and industrial products. Additionally, the TPU compositions of this invention are typically essentially free of plasticizers and are preferably void of plasticizers. The term essentially free of plasticizers means that there is less than 5% by weight of plasticizer in the TPU composition. The properties of these TPUs include high temperature resistance which is characterized by a melting point of at least about 170° C., typically greater than 185° C. and preferably at least 200° C. The TPUs of this invention are also soft polymers having a Shore A hardness of less than 75, preferably less than 70, and most preferably less than 65. The hardness is measured after 5 seconds and according to ASTM D2240. They also have low tensile set characteristics of less than 15%, preferably less than 10%, and most preferably less than 5% (by ASTM D412 at 200% strain).

The present invention more specifically discloses a thermoplastic polyurethane which is comprised of the reaction product of (1) a hydroxyl terminated intermediate, (2) a polyisocyanate, and (3) a glycol chain extender selected from the group consisting of ethylene glycol and propylene glycol; wherein the hydroxyl terminated intermediate is selected from the group consisting of hydroxyl terminated polyether intermediates and hydroxyl terminated polyester intermediates; wherein the hydroxyl terminated intermediate is comprised of repeat units that are derived from a branched glycol or is comprised of at least 2 different repeating units; wherein the thermoplastic polyurethane has a weight average molecular weight of at least 100,000 Daltons; wherein the thermoplastic polyurethane includes hard segments that are the reaction product of the polyisocyanate and the glycol chain extender; and wherein the hard segments represent from 10 weight percent to 40 weight percent of the total weight of the thermoplastic polyurethane. The hard segments will more typically represent from 15 weight percent to 30 weight percent of the total weight of the thermoplastic polyurethane.

The subject invention further reveals a shoe having an upper that is secured to an outsole shell by a welt and an insole rib, wherein the upper includes a quarter and a vamp, wherein the outer shell defines a void, wherein the welt is attached to and interconnects the upper, the insole, and the outsole shell, wherein the void is filled with a thermoplastic polyurethane which is comprised of the reaction product of (1) a hydroxyl terminated intermediate, (2) a polyisocyanate, and (3) a glycol chain extender selected from the group consisting of ethylene glycol and propylene glycol; wherein the hydroxyl terminated intermediate is selected from the group consisting of hydroxyl terminated polyether intermediates and hydroxyl terminated polyester intermediates; wherein the hydroxyl terminated intermediate is comprised of repeat units that are derived from a branched glycol or is comprised of at least 2 different repeating units; wherein the thermoplastic polyurethane has a weight average molecular weight of at least 100,000 Daltons; wherein the thermoplastic polyurethane includes hard segments that are the reaction product of the polyisocyanate and the glycol chain extender; and wherein the hard segments represent from 10 weight percent to 40 weight percent of the total weight of the thermoplastic polyurethane.

The present invention also discloses a shoe having an upper and a sole, wherein the sole is comprised of an outsole portion and a midsole portion, wherein a thermoplastic polyurethane layer secures the outsole portion to the midsole portion, wherein the outsole comprised of a solid elastomeric material, wherein the midsole portion is comprised of a blown polyurethane composition, and wherein the thermoplastic layer is comprised of the reaction product of (1) a hydroxyl terminated intermediate, (2) a polyisocyanate, and (3) a glycol chain extender selected from the group consisting of ethylene glycol and propylene glycol; wherein the hydroxyl terminated intermediate is selected from the group consisting of hydroxyl terminated polyether intermediates and hydroxyl terminated polyester intermediates; wherein the hydroxyl terminated intermediate is comprised of repeat units that are derived from a branched glycol or is comprised of at least 2 different repeating units; wherein the thermoplastic polyurethane has a weight average molecular weight of at least 100,000 Daltons; wherein the thermoplastic polyurethane includes hard segments that are the reaction product of the polyisocyanate and the glycol chain extender; and wherein the hard segments represent from 10 weight percent to 40 weight percent of the total weight of the thermoplastic polyurethane.

The subject invention also discloses a fabric that can be woven, knit, or non-woven which is comprised of melt spun thermoplastic polyurethane fibers, wherein the melt spun thermoplastic polyurethane is comprised of the reaction product of (1) a hydroxyl terminated intermediate, (2) a polyisocyanate, and (3) a glycol chain extender selected from the group consisting of ethylene glycol and propylene glycol; wherein the hydroxyl terminated intermediate is selected from the group consisting of hydroxyl terminated polyether intermediates and hydroxyl terminated polyester intermediates; wherein the hydroxyl terminated intermediate is comprised of repeat units that are derived from a branched glycol or is comprised of at least 2 different repeating units; wherein the thermoplastic polyurethane has a weight average molecular weight of at least 100,000 Daltons; wherein the thermoplastic polyurethane includes hard segments that are the reaction product of the polyisocyanate and the glycol chain extender; and wherein the hard segments represent from 10 weight percent to 40 weight percent of the total weight of the thermoplastic polyurethane. In some cases the melt spun thermoplastic polyurethane fibers are also combined with melt spun polyester fibers in making the fabric.

The present invention further discloses a process for manufacturing a molded article which comprises (a) heating a thermoplastic polyurethane composition to a temperature which is above the melting point of the thermoplastic polyurethane composition, wherein the thermoplastic polyurethane composition is comprised of the reaction product of (1) a hydroxyl terminated intermediate, (2) a polyisocyanate, and (3) a glycol chain extender selected from the group consisting of ethylene glycol and propylene glycol; wherein the hydroxyl terminated intermediate is selected from the group consisting of hydroxyl terminated polyether intermediates and hydroxyl terminated polyester intermediates; wherein the hydroxyl terminated intermediate is comprised of repeat units that are derived from a branched glycol or is comprised of at least 2 different repeating units; wherein the thermoplastic polyurethane has a weight average molecular weight of at least 100,000 Daltons; wherein the thermoplastic polyurethane includes hard segments that are the reaction product of the polyisocyanate and the glycol chain extender; and wherein the hard segments represent from 10 weight percent to 40 weight percent of the total weight of the thermoplastic polyurethane; (b) injecting the thermoplastic polyurethane composition into a mold; (c) cooling the thermoplastic polyurethane composition in the mold to a temperature which is below the melting point of the thermoplastic polyurethane composition to produce the molded article; and (d) removing the molded article from the mold. Even though the thermoplastic polyurethane compositions of this invention are very soft in nature, they offer the advantage of having little tendency to stick to molds. Accordingly, they are highly advantageous for utilization in injection molding applications.

DETAILED DESCRIPTION OF THE INVENTION

The thermoplastic polyurethane of this invention is the reaction product of (1) a hydroxyl terminated intermediate, (2) a polyisocyanate, and (3) a glycol chain extender selected from the group consisting of ethylene glycol and propylene glycol. The technique under which these reactants are polymerized to synthesize the thermoplastic polyurethane is conducted utilizing conventional equipment, catalysts, and procedures. However, the polymerization is conducted in a manner that will result in the needed molecular weight. It is also conducted using specific hydroxyl terminated intermediates and with ethylene glycol and/or propylene glycol being utilized as the chain extender.

The hydroxyl terminated intermediate used in making the thermoplastic polyurethane is a hydroxyl terminated polyether intermediate or a hydroxyl terminated polyester intermediate. To inhibit crystallization, the hydroxyl terminated intermediate is (1) comprised of repeat units that are derived from a branched glycol, or (2) is a random copolyether or a random copolyester. For example, a hydroxyl terminated random copolyether intermediate can be synthesized reacting two different alkyl diols or glycols with an alkylene oxide. In the alternative, the alkyl diol or glycol can be branched to inhibit crystallization.

The alkyl diols or glycols used in making the hydroxyl terminated polyether intermediate will typically contain from 2 to 12 carbon atoms and the alkylene oxide will typically contain from 2 to 6 carbon atoms. The glycols that can be used in making the hydroxyl terminated polyester intermediate can be aliphatic, aromatic, or combinations thereof, and normally contain a total of from 2 to 8 carbon atoms. Some representative examples of glycols that can be used include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Some preferred glycols include ethylene glycol, 1,3-propanediol and 1,4-butanediol. Ethylene oxide and propylene oxide are representative examples of alkylene oxides that can be used in synthesizing the hydroxyl functional polyether intermediate.

A hydroxyl functional random copolyether intermediate that is useful in the practice of this invention can be produced by first reacting propylene glycol with propylene oxide followed by subsequent reaction with ethylene oxide. This results in the formation of poly(propylene-ethylene)glycol. Some representative examples of additional useful hydroxyl functional polyether polyols include poly(ethylene)glycol, poly(propylene)glycol, and poly(tetra methylene ether)glycol, and the like. Poly(tetra methylene ether)glycol is a highly preferred hydroxyl functional polyether polyol for use in making the thermoplastic polyurethanes of this invention.

Hydroxyl terminated random copolyester intermediates can be synthesized through (1) an esterification reaction of two different alkyl diols or glycols with one or more dicarboxylic acids or anhydrides, or (2) a transesterification reaction of two different alkyl diols or glycols with one or more esters of dicarboxylic acids. In the alternative the alkyl diol or glycol can be branched to inhibit crystallization of the hydroxyl terminated copolyester intermediate.

The diols or glycols used in making the hydroxyl terminated polyester intermediate are the same as the diols or glycols that can be used in synthesizing the hydroxyl terminated polyether intermediate. The dicarboxylic acids used in making the hydroxyl terminated copolyester intermediate can be aliphatic, cycloaliphatic, aromatic, or combinations thereof. Suitable dicarboxylic acids which may be used alone or in mixtures generally have a total of from 4 to 15 carbon atoms and include: succinic acid, glutaric acid, adipic acid, pimelic acid, suberic acid, azelaic acid, sebacic acid, dodecanedioic acid, phthalic acid, isophthalic acid, terephthalic acid, 2,6-naphthalene dicarboxylic acid, cyclohexane dicarboxylic acid, and the like. Adipic acid is a preferred acid. Anhydrides of the above dicarboxylic acids, such as phthalic anhydride, tetrahydrophthalic anhydride, or the like, can also be used to synthesize the intermediate by a transesterification reaction as previously explained. Some representative examples of useful hydroxyl functional random copolyester polyols include poly(butylene hexylene adipate)glycol, poly(ethylene hexylene adipate)glycol, poly(propylene hexylene adipate)glycol, poly(ethylene butylene adipate)glycol, poly(butylene hexylene succinate)glycol, poly(butylene hexylene glutarate)glycol, poly(butylene hexylene pimelate)glycol, poly(butylene hexylene azelate)glycol, poly(butylene hexylene terephthalate)glycol, poly(butylene hexylene isophthalate)glycol, and the like. Poly(butylene hexylene adipate)glycol is a highly preferred hydroxyl functional copolyester polyol for utilization in the practice of this invention.

The hydroxyl terminated polyether intermediate or the hydroxyl terminated polyester intermediate used in making the thermoplastic polyurethanes of this invention will typically have a number average molecular weight (Mn), as determined by assay of the terminal functional groups, which is within the range of about 350 to about 10,000 Daltons, desirably from about 500 to about 5,000, preferably from about 700 to about 4,000, and most preferred from about 1,000 to about 3,000. A blend of two or more hydroxyl terminated intermediates may be used to make the TPU of this invention.

The glycol chain extender used in making the thermoplastic polyurethane of this invention is either ethylene glycol, propylene glycol or a mixture thereof. The glycol chain extender can also include 1,4-butane glycol, 1,5-pentane diol, and 1,6-hexane diol. It is highly preferred to utilize only ethylene glycol and/or propylene glycol as the chain extender. The most preferred chain extender is ethylene glycol with it being preferred for the chain extender to consist entirely of ethylene glycol.

The polyisocyanate used in synthesizing the thermoplastic polyurethane is preferably a diisocyanate. While aliphatic diisocyanates can be utilized, aromatic diisocyanates are highly preferred. Moreover, the use of multifunctional isocyanate compounds, i.e., triisocyanates, etc., which cause crosslinking, are generally avoided and thus the amount used, if any, is generally less than 4 mole percent and preferably less than 2 mole percent based upon the total moles of all of the various isocyanates used. Suitable diisocyanates include aromatic diisocyanates such as: 4,4'-methylene bis-(phenyl isocyanate) (MDI); m-xylene diisocyanate (XDI), phenylene-1-4-diisocyanate, naphthalene-1,5-diisocyanate, diphenylmethane-3,3'-dimethoxy-4,4'-diisocyanate, o-tolidine diisocyanate (TODI), and toluene diisocyanate (TDI); as well as aliphatic diisocyanates such as isophorone diisocyanate (IPDI), 1,4-cyclohexyl diisocyanate (CHDI), decane-1, 10-diisocyanate, and dicyclohexylmethane-4,4'-diisocyanate. Dimers and trimers of the above diisocyanates may also be used as well as a blend of two or more diisocyanates may be used.

The polyisocyanate used in this invention may be in the form of a low molecular weight polymer or oligomer which is end capped with an isocyanate. For example, the hydroxyl terminated polyether intermediate described above may be reacted with an isocyanate-containing compound to create a low molecular weight polymer end capped with isocyanate. In the TPU art, such materials are normally referred to as pre-polymers. Such pre-polymers normally have a number average molecular weight (Mn) which is within the range of about 1000 to about 10,000 Daltons.

The mole ratio of the one or more diisocyanates is generally from about 0.95 to about 1.05, and preferably from about 0.98 to about 1.03 moles per mole of the total moles of the one or more hydroxyl terminated polyether and/or polyester intermediates and the one or more chain extenders.

The process to produce the TPU polymer of this invention can utilize conventional TPU manufacturing equipment. The hydroxyl terminated polyether intermediate, the diisocyanate, and the chain extender, as noted above, are generally added together and reacted in accordance with any conventional urethane reaction method. Preferably, the TPU forming components of the present invention are melt polymerized in a suitable mixer, such as an internal mixer known as a Banbury mixer, or preferably an extruder. In the preferred process, the hydroxyl terminated polyether intermediate is blended with the glycol chain extender and added to the extruder as a blend. The diisocyanate is added separately to the extruder. Suitable processing or polymerization starting temperatures of the diisocyanate is from about 100° C. to about 200° C., and preferably from about 100° C. to about 150° C. Suitable processing or polymerization starting temperatures of the blend of the hydroxyl terminated polyether intermediate and the chain extender is from about 100° C. to about 220° C., and preferably from about 150° C. to 200° C. Suitable mixing times in order to enable the various components to react and form the TPU polymers of the present invention are generally from about 2 to about 10 minutes, and preferably from about 3 to about 5 minutes.

The preferred process to produce the TPU of this invention is the process referred to as the one-shot polymerization process. In the one-shot polymerization process which generally occurs in situ, a simultaneous reaction occurs between three components, that is the one or more hydroxyl terminated intermediates, the glycol, and the diisocyanate. The reaction is generally initiated at a temperature of from about 90° C. to about 120° C. Inasmuch as the reaction is exothermic, the reaction temperature generally increases to about 220° C. to 250° C. In cases where ethylene glycol is used as the chain extender, it is important to limit the temperature of this exothermic reaction to a maximum of 235° C. to prevent undesired levels of foam formation. The TPU polymer will exit the reaction extruder and be pelletized. The pellets of TPU are normally stored in a heated vessel to continue the reaction and to dry the TPU pellets.

It is often desirable to utilize catalysts such as stannous and other metal carboxylates as well as tertiary amines. Examples of metal carboxylates catalysts include stannous octoate, dibutyl tin dilaurate, phenyl mercuric propionate, lead octoate, iron acetylacetonate, magnesium acetylacetonate, and the like. Examples of tertiary amine catalysts include triethylene diamine, and the like. The amount of the one or more catalysts is low, generally from about 50 to about 100 parts by weight per million parts by weight of the end TPU polymer formed.

The weight average molecular weight (Mw) of the TPU polymer of the present invention range from about 100,000 to about 600,000 Daltons, preferably from about 100,000 to about 300,000 Daltons, and more preferably from about 120,000 to about 250,000 Daltons. The Mw of the TPU polymer is measured according to gel permeation chromatography (GPC) against polystyrene standard.

When a higher molecular weight TPU polymer is desired, it can be achieved by using a small amount of a cross linking agent having an average functionality greater than 2.0 to induce cross linking. The amount of cross linking agent used is preferably less than 2 mole percent of the total moles of chain extender, and more preferably less than 1 mole percent. A particularly desirable method to increase the molecular weight in the preferred TPU polymer is to replace less than 1 mole percent of the chain extender with trimethylol propane (TMP).

The cross linking is accomplished by adding a cross linking agent having an average functionality greater than 2.0 together with the hydroxyl terminated intermediate, the isocyanate compound, and chain extender in the reaction mixture to manufacture the TPU polymer. The amount of cross linking agent used in the reaction mixture to make the TPU polymer will depend on the desired molecular weight and the effectiveness of the particular cross linking agent used. Usually, less than 2.0 mole percent, and preferably less than 1.0 mole percent, based on the total moles of chain extender used in making the TPU polymer are used. Levels of cross linking agent greater than 2.0 mole percent, based on the total moles of chain extender would be difficult to melt process. Therefore, the level of cross linking agent used is from about 0.05 mole percent to about 2.0 mole percent based on the total moles of chain extender.

The cross linking agents can be any monomeric or oligomeric materials which have an average functionality of greater than 2.0 and have the ability to cross link the TPU polymer. Such materials are well known in the art of thermoset polyurethanes. Preferred cross linking agents include trimethylol propane (TMP) and pentaerythritol. Trimethylol propane has been found to particularly be a desirable cross linking agent.

The TPU polymers of the present invention can be mixed with various conventional additives or compounding agents, such as fillers, extenders, pigments, lubricants, UV absorbers, and the like. However, the TPUs of this invention are normally free of plasticizers. Fillers that can be used include talc, silicates, clays, calcium carbonate, and the like. The level of conventional additives will depend on the final properties and cost of the desired end-use application, as is well known to those skilled in the art of compounding TPUs. The additives may be added during the reaction to form the TPU, but are normally added in a second compounding step.

The TPU polymer of this invention has a high melting point of at least about 170° C., preferably at least about 185° C., and most preferably at least about 200° C. The TPUs of this invention will typically have a melt point which is within the range of 170° C. to 240° C., and will more typically have a melting point which is within the range of 185° C. to 220° C. The TPUs of this invention will preferably have a melting point which is within the range of 200° C. to 220° C. A high melting point is important in applications using melt spun fibers with other synthetic fibers, such as polyester. Certain melt coating applications also require a high melting point TPU to withstand the manufacturing process, especially those applications which require the use of fluorinated polymers. The melting point of the TPU polymer can be measured according to ASTM D-3417-99 using a differential scanning calorimeter (DSC). However, in the case of very soft polymers the Kofler method can be used to measure the melting point of the TPU.

The TPUs of this invention offer excellent resistance against compression set and tensile set. For instance, the TPUs of this invention offer a tensile set at 200% strain of less than 15%, preferably less than 10%, and most preferably less than 5%.

TPU compositions of this invention have characteristics that make them particularly desirable for utilization in manufacturing melt spun fibers, injection molded products, such as shoe components, and a wide array of other consumer and industrial products. When making melt spun fibers from the TPU of this invention, it is preferred to use an additive to slightly crosslink the TPU. The preferred additive is diphenyl methane diisocyanate terminated polyether prepolymer or diphenylmethane diisocyanate-terminated polyester prepolymer. These materials are polyether or polyester glycols where the hydroxyl groups are converted to isocyanate groups to provide isocyanate termination. The crosslinking additives are available from Hyperlast Limited, U.K. as Hyperlast®

5130 for the polyether prepolymer and as Diprane® 5128 and Diprane® 5184 for the polyester prepolymer. The preferred crosslinking additive is diphenyl methane diisocyanate-terminated polyester prepolymer derived from poly(1,4-butanediol/neopentyl glycol)adipate having a number average molecular weight of about 2000 Daltons and MDI. The amount of crosslinking additive used in making the preferred melt spun fibers is from about 5 weight percent to about 20 weight percent, and preferably from about 10 weight percent to about 15 weight percent of the fiber. Melt spun fibers can be made from the TPU polymer of this invention without the use of a cross linking additive. However, it has been found that the crosslinking additive will enhance the fiber performance.

The fiber is made by melt spinning the TPU mixed with the crosslinking additive. Melt spinning is a well known process in which a polymer is melted by extrusion, passed through a spinning nozzle into air, solidified by cooling, and collected by winding the fibers on a collection device. Typically the fibers are preferred melt spun at a polymer temperature of about 150° C. to about 300° C.

The melt spun fibers made from the TPU of this invention can be combined with other fibers and used in clothing apparel. Prior art melt spun TPU fibers are normally combined with cotton fibers but not with polyester fibers. The TPU of this invention can also be combined with cotton but unlike the prior art TPU it can also be combined with polyester due to the high melting point of the TPU.

The TPUs of this invention are also well suited for utilization in manufacturing certain shoe components. For instance, in a shoe having an upper that is secured to an outsole shell by a welt and insole rib, wherein the outer shell defines a void, and wherein the welt is attached to and interconnects the upper, the insole, and the outsole shell, the void can advantageously be filled with the TPU of this invention. In such a shoe design, the upper is of a standard design that includes a quarter and a vamp. Such a shoe design is described in greater detail by U.S. Pat. No. 7,225,491. The teachings of U.S. Pat. No. 7,225,491 are incorporated herein by reference for the purpose of illustration a shoe design in which the TPU of this invention can be used as a filling material for a void defined by the outsole shell of the shoe.

U.S. Pat. No. 6,749,781 discloses a shoe sole wherein a TPU layer secures an outsole portion to a midsole portion. The outsole is preferably an elastomeric solid material, such as a suitable synthetic rubber. For instance, carboxylated nitrile rubber can be advantageously used in making the outsole of such shoe soles. The outsole is adapted for engaging the ground, pavement, floors, and the like when a person is wearing a shoe made with the sole. The midsole portion is typically comprised of a blown polyurethane composition which is secured to the outsole with the TPU layer. The TPU of this invention can advantageously be used in making such a TPU layer. Shoe sole designs of this type are described in greater detail by the teachings of U.S. Pat. No. 6,749,781 which are incorporated herein for the purpose of illustrating shoe soles in which the TPU of this invention can be utilized as the TPU layer.

This invention is illustrated by the following examples that are merely for the purpose of illustration and are not to be regarded as limiting the scope of the invention or the manner in which it can be practiced. Unless specifically indicated otherwise, parts and percentages are given by weight.

Examples 1-5 and Comparative Example 6

The TPUs made in this series of experiments were all made using the one-shot polymerization process and using the same general procedure. The procedure used involved heating a blend of hydroxyl terminated polyester intermediate and chain extender, and diisocyanate separately to about 150° C. and then mixing the ingredients. The chain extender used was ethylene glycol and the diisocyanate used was MDI. The reactions were exothermic and the temperature increased to within the range of about 200° C. to 250° C. in about 1 to 5 minutes, during which time polymerization took place as evidenced by an increase in viscosity. The hydroxyl terminated intermediate used in making the TPU and the weight average molecular weight of the TPU made are reported in Table 1. The physical properties of the TPUs formed were measured and are also reported in Table 1. It should be noted that Example 6 is a comparative example wherein 3000 Mn poly(butylene adipate)glycol (PBAG) was used as the hydroxyl terminated polyester intermediate. In Examples 1-5, poly(butylene hexylene adipate)glycol (PBHAG) was employed as the hydroxyl terminated polyester intermediate.

TABLE 1

| | Example | | | | | |
|---|---|---|---|---|---|---|
| | 1 | 2 | 3 | 4 | 5 | 6-Comp. |
| Hard Segment | 21% | 21% | 21% | 21% | 21% | 21% |
| Intermediate | PBHAG | PBHAG | PBHAG | PBHAG | PBHAG | PBAG |
| Melt Index @210° C./3800 g (g/10 min.) | 63 | 64 | 53 | 39 | 37 | 56 |
| Mw (Daltons) | 162,000 | 180,000 | 202,000 | 258,000 | 273,000 | 182,000 |
| Mn (Daltons) | 76,000 | 74,000 | 72,000 | 93,000 | 81,000 | — |
| Mw/Mn | 2.13 | 2.43 | 2.80 | 2.77 | 3.38 | — |
| Specific Gravity[1] | 1.171 | 1.156 | 1.157 | — | 1.158 | 1.196 |
| Shore A Hardness (peak)[2] | 68 | 67 | 68 | 69 | 68 | 95 |
| Shore A Hardness (5 sec.)[2] | 64 | 63 | 64 | 65 | 65 | 94 |
| Stress at 50% Strain (psi)[3] | 270 | 270 | 280 | — | 300 | 935 |
| Stress at 100% Strain (psi)[3] | 340 | 340 | 350 | — | 380 | 975 |
| Stress at 300% Strain (psi)[3] | 630 | 630 | 660 | — | 740 | 1540 |
| Stress at Break (psi)[3] | 5490 | 5220 | 5740 | — | 6260 | 6920 |
| Strain at Break (%)[3] | 680 | 645 | 615 | — | 550 | 575 |

TABLE 1-continued

|  | Example | | | | | |
|---|---|---|---|---|---|---|
|  | 1 | 2 | 3 | 4 | 5 | 6-Comp. |
| Tensile Set at 200% Strain[3] | 6.5 | 4.7 | 4.1 | — | 2.9 | 86 |
| Kofler Melting Point (° C.) | — | — | — | — | — | 190 |

[1]Determined by ASTM D792
[2]Determined by ASTM D2240
[3]Determined by ASTM D412

As can be seen from Table 1, the TPU samples made using 2500 Mn poly(butylene hexylene adipate)glycol (PBHAG) as the hydroxyl terminated polyester intermediate (Examples 1-5) all had a Shore A hardness of less than 70. This is in contrast to the TPU made in Comparative Example 6 which had a Shore A hardness of greater than 90. Accordingly, the TPU samples made with PBHAG were much softer than the TPU made with the PBAG. Additionally, the TPU samples made with PBHAG exhibited a tensile set of less than 7. This is again in contrast to the TPU made in Comparative Example 6 which had a tensile set of 86. Thus, the TPU samples made in Examples 1-5 offered highly superior tensile set characteristics as compared to the TPU made in Comparative Example 6.

Examples 7-8 and Comparative Example 9

In this series of experiments TPUs were made again using the general procedure and ingredients described in Examples 1-5 with the hard segment content of the polymers made being varied as shown in Table 2. The hydroxyl terminated intermediate used in making the TPU, the weight average molecular weight of the TPUs made, and the physical properties of the TPUs made are also reported in Table 2.

TABLE 2

|  | Example | | |
|---|---|---|---|
|  | 7 | 8 | Comp. 9 |
| Hard Segment | 21% | 28% | 21% |
| Intermediate | PBHAG | PBHAG | PBAG |
| Mw (Daltons) | 82,000 | 85,000 | 84,000 |
| Specific Gravity[1] | 1.164 | 1.175 | 1.200 |
| Shore A Hardness (peak)[2] | 88 | 77 | 88 |
| Shore A Hardness (5 sec.)[2] | 84 | 73 | 88 |
| Stress at 50% Strain (psi)[3] | 410 | 440 | 1080 |
| Stress at 100% Strain (psi)[3] | 440 | 540 | 1020 |
| Stress at 300% Strain (psi)[3] | 715 | 1070 | 1150 |
| Stress at Break (psi)[3] | 2990 | 3700 | 4130 |
| Strain at Break (%)[3] | 590 | 550 | 640 |
| Tensile Set at 200% Strain[3] | 14 | 10 | 92 |
| Kofler Melting Point (° C.) | 175 | 195 | 170 |

[1]Determined by ASTM D792
[2]Determined by ASTM D2240
[3]Determined by ASTM D412

These examples demonstrate that the TPU polymer needs to be sufficiently high in molecular weight to achieve the objective of low hardness. Comparing Example 7 with Example 1 of Table 1, it can be seen that although both polymers have 21% hard segment, the Mw of Example 1 is 162,000 Daltons and the Mw of Example 7 is 82,000 Daltons. The durometer hardness of Example 1 is 68 Shore A whereas the hardness of Example 7 is 88 Shore A. Normally, the higher the amount of hard segment in a TPU, the higher the hardness of the TPU. However, this normal relationship is not the case when the TPU is a low molecular weight TPU. It is believed this is caused by more phase separation in the low Mw TPU and thus more of the soft block will crystallize causing a higher hardness. This feature appears to be more pronounced when using PBHAG polyol than with PBAG polyol. The Mw of the TPU of this invention needs to be 100,000 Daltons and higher to achieve a soft TPU (75 or less Shore A durometer).

While certain representative embodiments and details have been shown for the purpose of illustrating the subject invention, it will be apparent to those skilled in this art that various changes and modifications can be made therein without departing from the scope of the subject invention.

What is claimed is:

1. A thermoplastic polyurethane which is comprised of the one-shot reaction product of (1) a hydroxyl terminated intermediate, (2) an aromatic diisocyanate, and (3) a glycol chain extender selected from the group consisting of ethylene glycol and propylene glycol;
    wherein the hydroxyl terminated intermediate is a hydroxyl terminated polyester intermediate comprised of repeat units that are derived from (i) an esterification reaction of two different glycols with one or more dicarboxylic acids or anhydrides, or (ii) a transesterification reaction of two different glycols with one or more esters of dicarboxylic acids;
    wherein the thermoplastic polyurethane has a weight average molecular weight of at least 100,000 Daltons;
    wherein the thermoplastic polyurethane includes hard segments that are the reaction product of the aromatic diisocyanate and the glycol chain extender; and wherein the hard segments represent from 10 weight percent to 40 weight percent of the total weight of the thermoplastic polyurethane; and
    wherein the thermoplastic polyurethane is substantially void of plasticizers and has a 5 seconds Shore A durometer of less than 70 as measured according to ASTM D2240.

2. A thermoplastic polyurethane as specified in claim 1 wherein the hydroxyl terminated intermediate further comprises a hydroxyl terminated polyether intermediate.

3. A thermoplastic polyurethane as specified in claim 2 wherein the hydroxyl terminated polyether intermediate includes repeat units that are derived from a branched glycol.

4. A thermoplastic polyurethane as specified in claim 1 wherein the hydroxyl terminated polyester intermediate includes repeat units that are derived from a branched glycol.

5. A thermoplastic polyurethane as specified in claim 1 wherein the hard segments represent from 18 weight percent to 25 weight percent of the total weight of the thermoplastic polyurethane.

6. A thermoplastic polyurethane as specified in claim 1 wherein the thermoplastic polyurethane has a weight average molecular weight which is within the range of 150,000 to 300,000 Daltons.

7. A thermoplastic polyurethane as specified in claim 1 wherein the glycol chain extender is ethylene glycol.

8. A thermoplastic polyurethane as specified in claim 1 wherein the aromatic diisocyanate is selected from the group consisting of 4,4'-methylene bis-(phenyl isocyanate), m-xylene diisocyanate, phenylene-1-4-diisocyanate, naphthalene-1,5-diisocyanate, diphenylmethane-3,3'-dimethoxy-4,4'-diisocyanate, o-tolidine diisocyanate, and toluene diisocyanate.

9. A thermoplastic polyurethane as specified in claim 1 wherein the aromatic diisocyanate is 4,4'-methylene bis-(phenyl isocyanate).

10. A thermoplastic polyurethane as specified in claim 1 wherein the hydroxyl terminated polyester intermediate is poly(butylene hexylene adipate) glycol.

11. A thermoplastic polyurethane as specified in claim 1 wherein the hard segments represent from 20 weight percent to 22 weight percent of the total weight of the thermoplastic polyurethane, wherein the thermoplastic polyurethane has a weight average molecular weight which is within the range of 150,000 to 300,000 Daltons, wherein the glycol chain extender is ethylene glycol, wherein the polyisocyanate is 4,4'-methylene bis-(phenyl isocyanate), and wherein the hydroxyl terminated polyester intermediate is poly(butylene hexylene adipate) glycol.

12. A fabric which is comprised of melt spun thermoplastic polyurethane fibers and melt spun polyester fibers, wherein the melt spun thermoplastic polyurethane is the thermoplastic polyurethane specified in claim 1.

13. A thermoplastic polyurethane composition wherein said thermoplastic polyurethane composition comprises the thermoplastic polyurethane of claim 1, is substantially free of plasticizers, and has the following features:
   (a) a hard segment content of from 15 to 30 weight percent;
   (b) a hardness of less than 65 Shore A durometer, as measured after 5 seconds according to ASTM D2240;
   (c) a tensile set of less than 15%, as determined according to ASTM D412 at 200% strain;
   (d) a Kofler melting point of at least 170° C.; and
   (e) a weight average molecular weight of from 100,000 to 600,000 Daltons, as determined according to gel permeation chromatography using polystyrene standard.

14. The thermoplastic polyurethane composition of claim 13 wherein said composition is free of plasticizer and has the following features:
   (a) a hardness of less than 70 Shore A durometer;
   (b) a tensile set of less than 10%;
   (c) a melting point greater than 185° C.; and
   (d) a weight average molecular weight of from 100,000 to 300,000 Daltons.

15. The thermoplastic polyurethane composition of claim 14 wherein said composition has the following features:
   (a) a hardness of less than 65 Shore A durometer;
   (b) a tensile set of less than 5%; and
   (c) a melting point of at least 200° C.

* * * * *